US006796328B2

United States Patent
Myles

(10) Patent No.: US 6,796,328 B2
(45) Date of Patent: Sep. 28, 2004

(54) DAMPER SYSTEM WITH SEALING PLUG

(76) Inventor: William Gordon Myles, 1615 Haywood, West Vancouver, British Columbia (CA), V7V 1W6

(*) Notice: Subject to any disclaimer, the term of this patent is extended or adjusted under 35 U.S.C. 154(b) by 190 days.

(21) Appl. No.: 10/103,428

(22) Filed: Mar. 21, 2002

(65) Prior Publication Data

US 2003/0178069 A1 Sep. 25, 2003

(51) Int. Cl.[7] ............................................. F16K 37/00
(52) U.S. Cl. ...................... 137/557; 251/212; 73/861.62
(58) Field of Search ........................ 137/557; 251/212; 73/861.61, 861.62

(56) References Cited

U.S. PATENT DOCUMENTS

| | | | | |
|---|---|---|---|---|
| 1,098,247 | A | * | 5/1914 | Gibbs ....................... 73/861.62 |
| 2,649,272 | A | * | 8/1953 | Barbato ...................... 251/212 |
| 2,830,617 | A | * | 4/1958 | Brown ....................... 251/212 |
| 3,101,736 | A | * | 8/1963 | Emile ......................... 251/212 |
| 3,159,179 | A | | 12/1964 | DeLain |
| 4,030,629 | A | * | 6/1977 | Melnikov .................... 251/212 |
| 4,122,668 | A | * | 10/1978 | Chou et al. .................. 251/212 |
| 5,234,021 | A | * | 8/1993 | Kozlak et al. .............. 73/861.63 |
| 5,379,792 | A | | 1/1995 | Van Becelaere |
| 5,481,925 | A | | 1/1996 | Woodbury |
| 5,736,651 | A | | 4/1998 | Bowers |

FOREIGN PATENT DOCUMENTS

| | | | | |
|---|---|---|---|---|
| FR | 418755 | * | 10/1910 | ................. 251/212 |
| FR | 1147940 | * | 12/1957 | ................. 251/212 |
| GB | 924377 | * | 4/1963 | ................. 251/212 |

* cited by examiner

*Primary Examiner*—John Rivell
(74) *Attorney, Agent, or Firm*—John J. Elnitski

(57) ABSTRACT

A damper system with a sealing plug, which incorporates an air flow monitoring system. The damper system utilizes current designs of the iris damper and incorporates a sealing plug positioned in the open circular cross-section of the iris damper. One version of the sealing plug incorporates a sealing groove in the sealing plug, while another version employs different types of sealing gaskets. The sealing groove and sealing gaskets provide a positive seal about the sealing plug when the iris blades are in the closed position. An additional feature that can be incorporated into the sealing plug is an air flow monitoring system. The sealing plug can include a chamber where total pressure of the air flow passing the sealing plug can be measured.

24 Claims, 6 Drawing Sheets

DAMPER SYSTEM WITH SEALING PLUG

BACKGROUND

The present invention generally relates to damper systems used to control air flow in heating and cooling forced-air ventilation systems. More specifically, the present invention relates to damper systems of an open circular cross-section that employs an iris shutter type construction to restrict air flow through the open circular cross-section.

Damper systems that employ an iris shutter type construction for air flow restriction are generally referred to as iris dampers. Iris dampers are inserted into the duct work of forced-air ventilation systems. Iris dampers 10 include an open circular cross-section 12, which allows the flow of the force air through the damper, as shown in FIG. 1. Iris dampers 10 also include a plurality of iris blades 14 which are stored in the casing 16 of the damper 10, as shown in FIG. 1. When air flow is to be restricted by the damper, the iris blades 14 rotate into the open circular cross-section 12, similar to the action of an iris shutter of a camera.

When set in the fully closed position, current large iris dampers for use in commercial applications still have an opening in the middle, through which air continues to flow. These iris dampers have been used for controlling the rate of air flow, but do not stop the air flow entirely. The iris blades do not form a perfect circle when closed, due to the sectional nature of the iris blades. Many commercial air flow applications, such as heath care isolation suites and research laboratories, require the damper to modulate from one hundred percent open to one hundred percent closed. In these commercial applications, the ability to measure air flow during modulation is commonly required. Most ventilation systems do not have the room for the installation of separate air flow measuring equipment. Standard pitot tubes are sometimes utilized in the center of the open circular cross-section to measure air flow. Current iris dampers do not provide a positive damper seal in the closed position about the pitot tube, due to their inability to close in a perfect circle about an object. To obtain a no flow condition some other type of closure device must be positioned upstream or downstream of the current iris damper. This adds to the complexity of the damper system installation. These type of installations also do not provide an accurate air flow signal during modulation of the closure device or iris blades. Another problem with the use of current pitot tubes is that they employ small diameter sensing ports that become plugged with dirt commonly found in ventilation air before the air is filtered.

It is an object of the present invention to provide an apparatus and means of sealing off the open circular cross-section of an iris damper when the iris blades are their closed position.

It is an object of the present invention to provide a total pressure device as part of the iris damper which over comes the problems associated with current pitot tubes.

SUMMARY

A damper system with a sealing plug, which incorporates an air flow monitoring system. The damper system utilizes current designs of the iris damper and incorporates a sealing plug positioned in the open circular cross-section of the iris damper. One version of the sealing plug incorporates a sealing groove in the sealing plug, while another version employs different types of sealing gaskets. The sealing groove and sealing gaskets provide a positive seal about the sealing plug when the iris blades are in the closed position. An additional feature that can be incorporated into the sealing plug is an air flow monitoring system. The sealing plug can include a chamber where total pressure of the air flow passing the sealing plug can be measured.

DETAILED DESCRIPTION

The present invention is a damper system with a sealing plug, which incorporates an air flow monitoring system, as shown in FIGS. 2–6. The damper system utilizes current designs of the iris damper and incorporates a sealing plug positioned in the open circular cross-section of the iris damper. One version of the sealing plug incorporates a sealing groove in the sealing plug, while another version employs different types of sealing gaskets. The sealing groove and sealing gaskets provide a positive seal about the sealing plug when the iris blades are in the closed position. An additional feature that can be incorporated into the sealing plug is an air flow monitoring system. The sealing plug can include a chamber where total pressure of the air flow passing the sealing plug can be measured. Currently available damper systems measure a differential pressure signal across the iris blades, which requires considerable scaling before a usable signal proportional to airflow is generated. The use of a total pressure signal that can be measured by the seating plug of the present invention utilizes industry standard equations without such scaling for the iris blades in order to calculate air flow. Other advantages to using a total pressure signal are that the signal will not be degraded by the open/close positioning of the iris blades and simple readily available signal processors can be employed. Therefore, the damper system of the present invention allows one to fully close off an iris damper and measure the average total pressure of the air flow during modulation of the iris blades.

Figure 1:
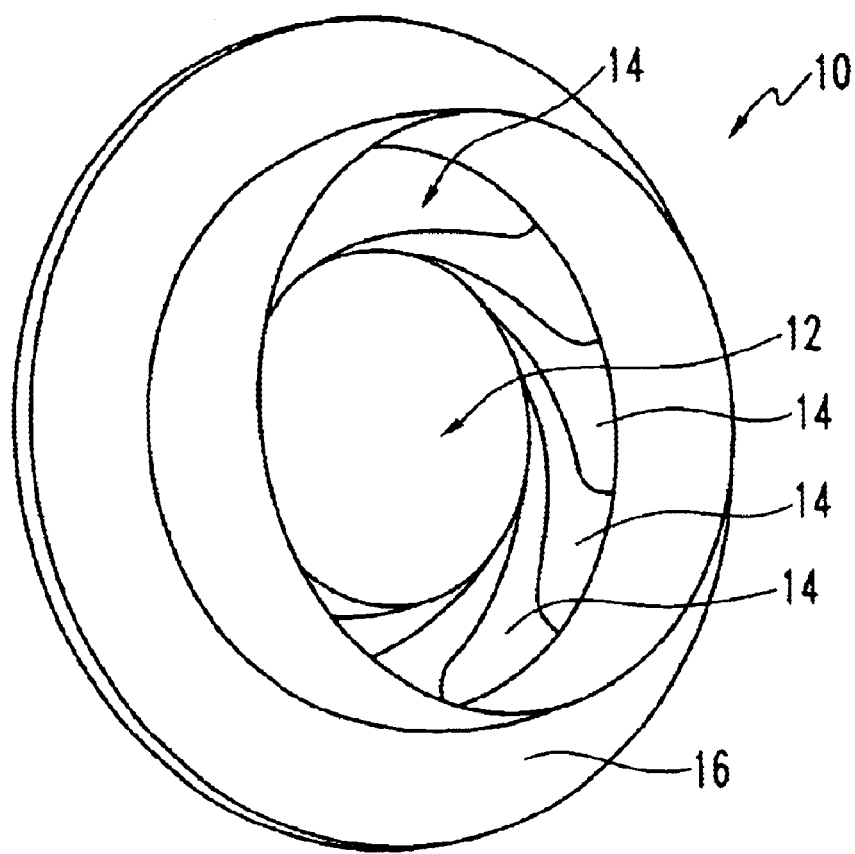
FIG. 1 is a perspective view of an iris damper according to prior art.
Figure 2:
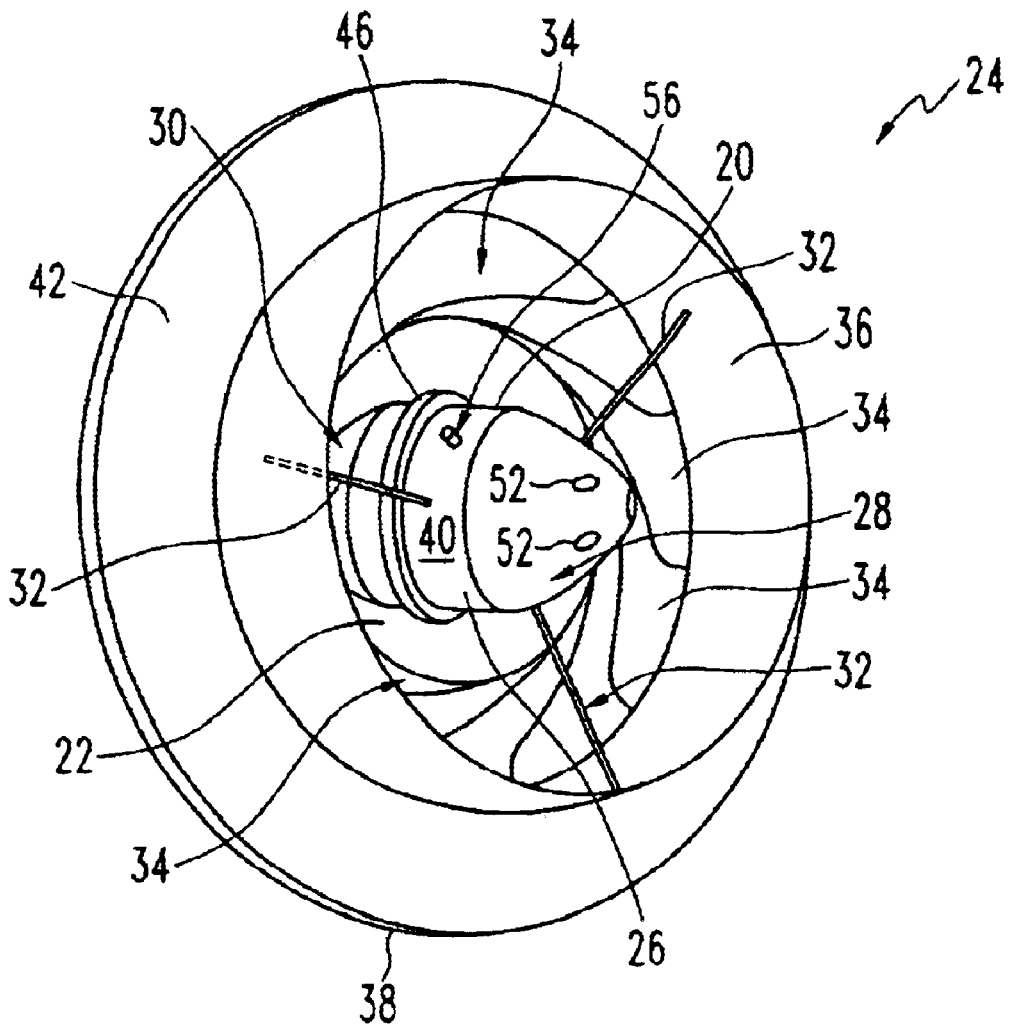
FIG. 2 is a perspective view of an iris damper with a sealing plug according to present invention.
Figure 3:
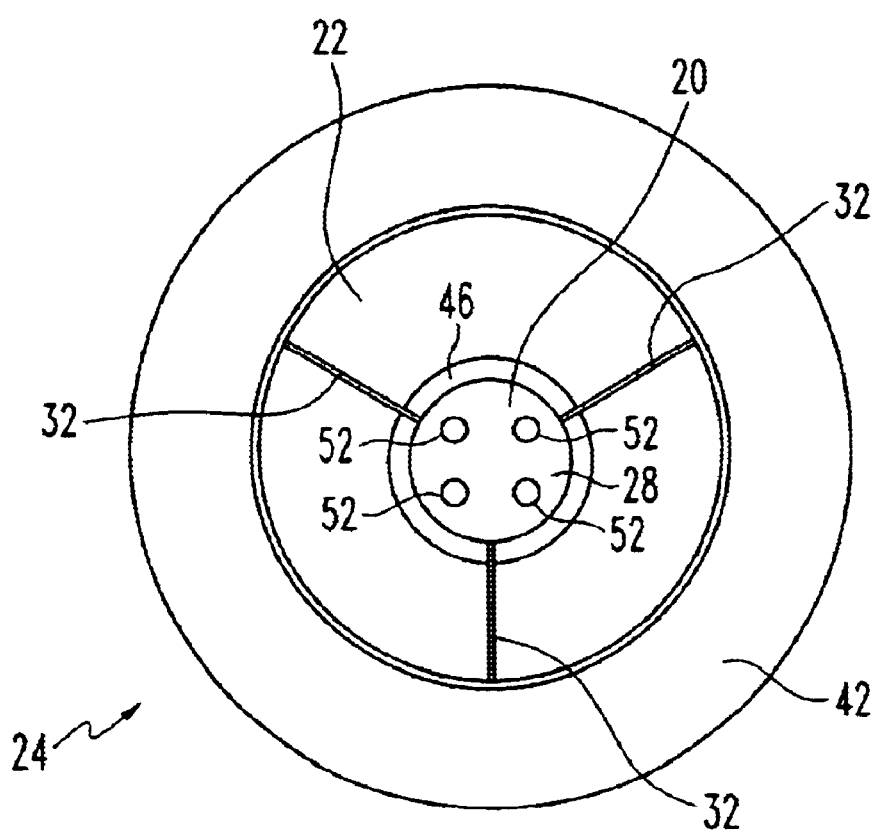
FIG. 3 is a schematic front view of the iris damper with a sealing plug of FIG. 2 according to present invention.

FIG. 2 shows a sealing plug 20 mounted in an open circular cross-section 22 of an iris damper 24, similar to the prior art iris damper 10 shown in FIG. 1. The sealing plug 20 is shown with a cylinder 26 for a middle and two cone shaped ends 28, 30, as shown in FIGS. 2, 4–6. The cone shaped ends 28, 30 provide a less abrupt surface to minimize the disruption of the air flow through the open circular cross-section 22, as the air passes about the sealing plug 20. FIGS. 2–6 show the sealing plug 20 mounted in the open circular cross-section 22 using three support struts 32. The support struts 32 are shown forward of iris blades 34. The support struts 32 are attached between an inner wall 36 of a casing 38 of the iris damper 24 and an outside wall 40 of the cylinder 26 of the sealing plug 20. There are many known fastening means that can be employed for the attachment of the support struts 32. The diameter of the cylinder 26 of the sealing plug 20 varies with each size of iris damper 24. To minimize the pressure drop loss through the iris damper, the diameter of the cylinder 26 is selected to match the circular opening which remains when the iris blades 34 are fully closed. To use a larger diameter would unnecessarily restrict airflow when the iris damper's fully open setting was selected. Typically a twelve inch (12") iris damper would have approximately a five inch (5") diameter sealing plug. The sealing plug 20 and support struts 32 are typically aluminum or stainless steel, though other materials can be used.

Figure 4:
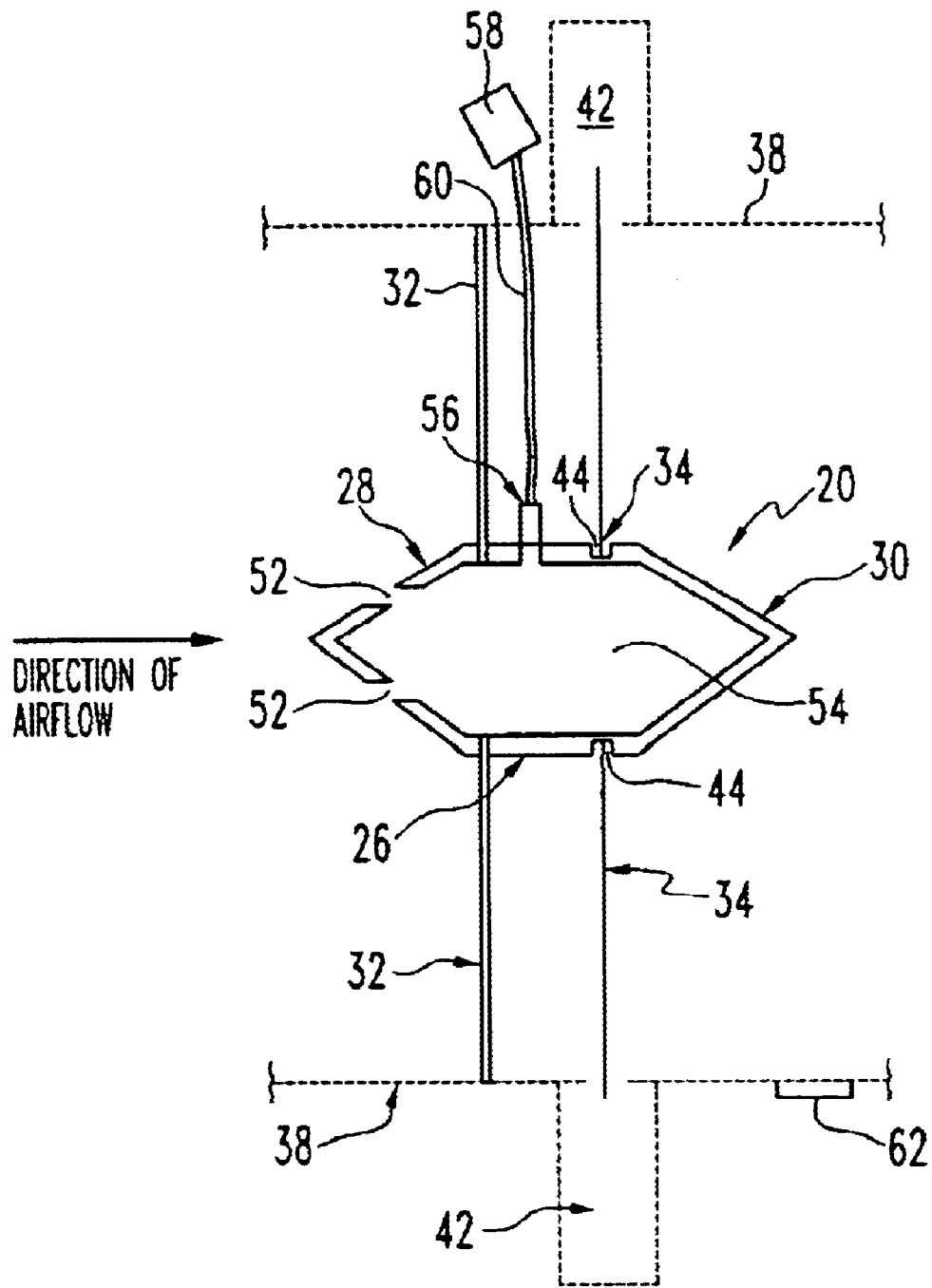
FIG. 4 is a schematic side view one version of the iris damper with a sealing plug of FIG. 2 according to present invention.
Figure 5:
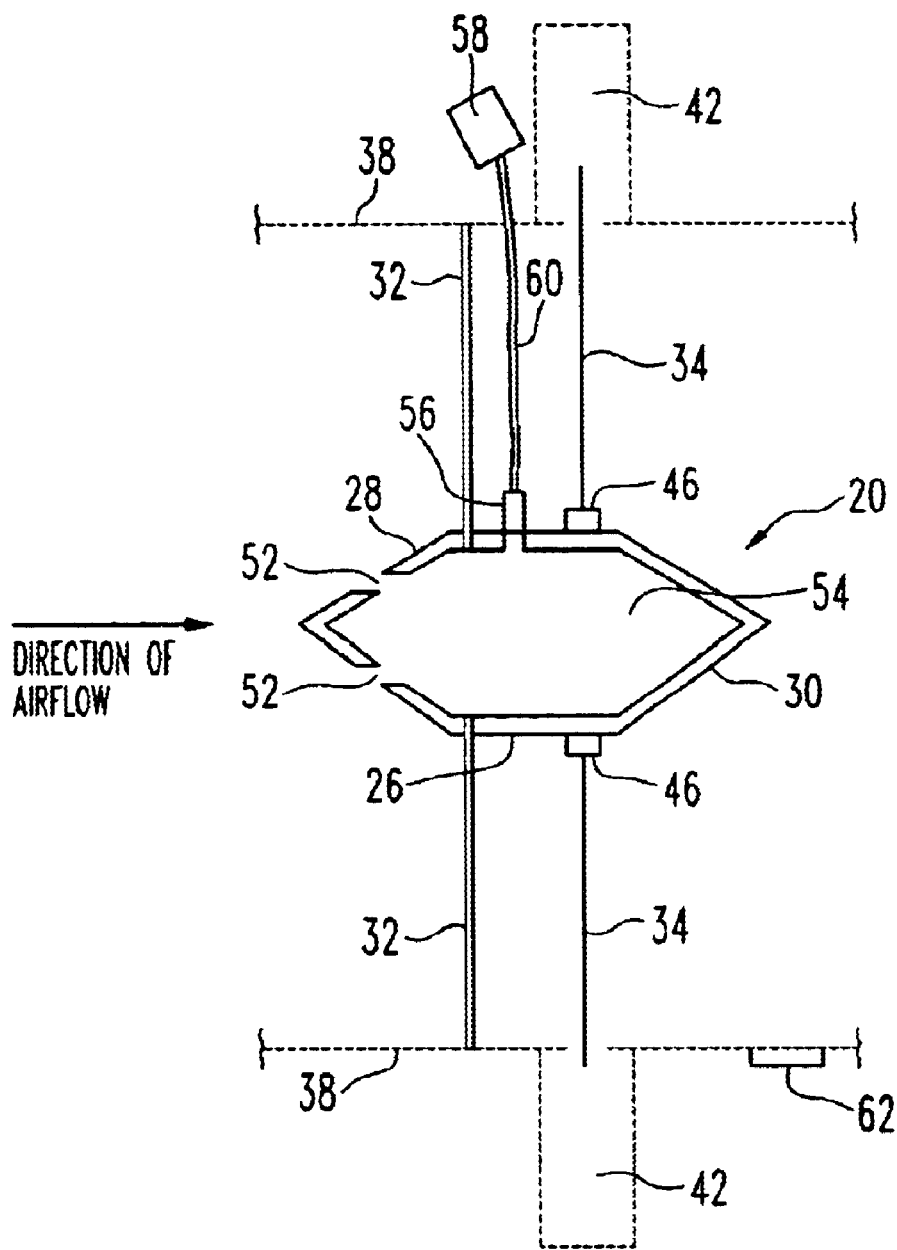
FIG. 5 is a schematic side view another version of the iris damper with a sealing plug of FIG. 2 according to present invention.
Figure 6:
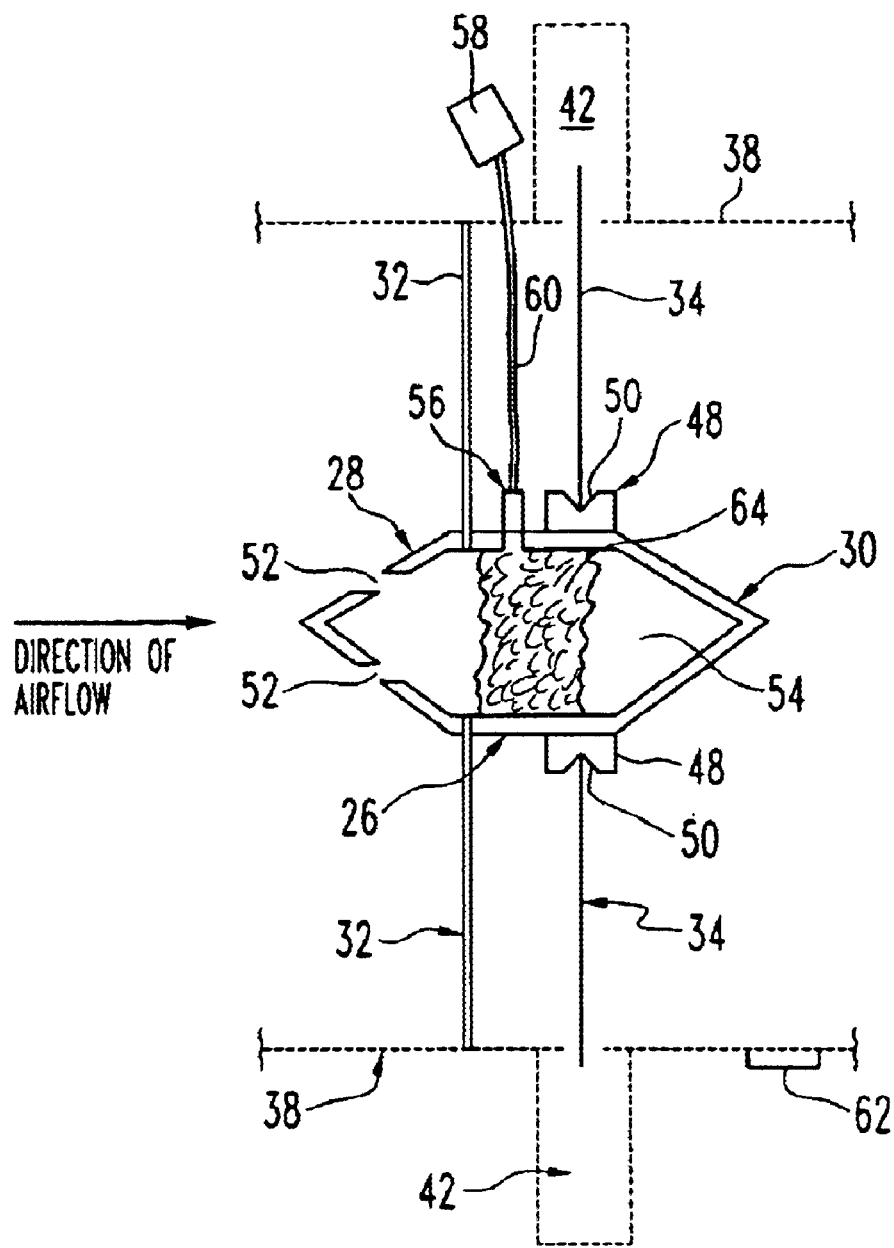
FIG. 6 is a schematic side view another version of the iris damper with a sealing plug of FIG. 2 according to present invention.

The iris blades 34 are usually stored in a storage area 42 of the casing 38 of the iris damper 24. The iris blades 34 are manipulated from the storage area 42 and into the open circular cross-section 22. Current iris dampers employ either an electronic motor control or manual mechanism to manipulate the iris blades 34 between the storage area 42 and the open circular cross-section 22. It is possible to set the movement of the iris blades 34 anywhere from a fully open position to a fully closed position and any pre-set limit there between, using electronic or manual settings. This allows one to manipulate and set the iris blades 34 to interface with the sealing plug 20. FIG. 4 shows a first version of the sealing plug 20 which includes a groove 44 formed about the circumference of the cylinder 26. The groove 44 is sized to accept the edges of the iris blades 34 which close against the sealing plug 20 in order to close off the open circular cross-section 22 from air flow. As explained above, the iris blades 34 can be set to close only as far as the groove 44 in the sealing plug 20. FIGS. 5–6 show another version of the sealing plug 20, which includes a sealing gasket attached about the circumference of the cylinder 26 of the sealing plug 20 to provide an airtight seal. The attachment of the sealing gasket can be of any many number of known methods. The iris blades 34 close against the sealing gasket to seal off the open circular cross-section 22. FIG. 5 shows a solid gasket 46, in which the iris blades 34 would be pressured against the solid gasket 46 to maintain a seal. The solid gasket 46 can be of a soft enough material, so that the iris blades 34 would impinge inward against the flexible solid gasket 46 to form a tighter seal. FIG. 6 shows a grooved gasket 48 which has a v-shaped groove 50 to receive the iris blades 34 in the same manner as the groove 44 in the sealing plug 20 of the first version. The v-shaped groove 50 could be of any other shape, as long as it provides a seal between the iris blades 34 and the sealing plug 20. The sealing gasket material should be selected to suit operating temperature and air quality conditions of the environment that iris damper 24 is to be installed. The sealing gasket would typically be a compressible material such as neoprene, rubber or other material suitable for the specific operating temperatures and air contaminants. It is also envisioned that a sealing gasket material could be attached in the groove 44 of the sealing plug 20 of the first version.

The ability to measure airflow through the iris damper 24 during modulation of the iris blades 34 is commonly required to provide a proper position setting of the iris blades 34 for a particular desired air flow. In FIGS. 3–6 the sealing plug 20 is shown with a plurality of air flow inputs 52 in the forward cone end 28. The air flow inputs 52 of the sealing plug 20 are positioned to face into the direction of airflow. The air flow inputs 52 lead to a chamber 54 inside the sealing plug 20, which is formed by the cylinder 26 and the rear cone end 30 that is sealed. The sealing plug 20 shown includes an air pressure sensing port 56 inside the sealing plug 20. The air pressure sensing port 56 is connected to a remote signal processor 58 by tubing 60 in order to determine the total pressure in the chamber 54 of the sealing plug 20. A static pressure sensor 62 is mounted on the casing 38 of the iris damper 24 and connected to the same remote signal processor 58. The total pressure signal when combined with the measured static pressure signal allows the remote signal processor to provide an air volume signal. The total pressure and static pressure signals also allow for an accurate air flow signal to be generated for all iris blade positions. Air entering the iris damper 24 enters the air flow inputs 52 of the forward cone end 28 creating a total pressure signal inside the chamber 54. The air flow inputs 52 can be as large as or larger than one inch, which makes the sealing plug 20 more immune to contamination than the small inlets of conventional pitot tubes commonly used today. Additionally, FIG. 6 shows a porous noise absorption media 64 used to suppress noise created by the air flow entering the chamber 54.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A damper system for controlling air flow in air ducting comprising:
    an iris damper having a casing, iris blades, and an open cross-section to allow air to pass;
    a sealing plug mounted in said open cross-section;
    a seal about said sealing plug which engages said iris blades to provide a seal between said sealing plug and said iris blades to prevent the air from passing through said open cross-section when said iris blades close off said open cross-section, said seal is a groove about said sealing plug.

2. The damper system of claim 1, wherein said separate material is flexible in nature.

3. The damper system of claim 1, wherein said grove includes gasket material in said groove.

4. The damper system of claim 1, wherein said groove is v-shaped.

5. A damper system for controlling air flow in air ducting comprising:
    an iris damper having a casing, iris blades, and an open cross-section to allow air to pass;
    a sealing plug mounted in said open cross-section;
    a seal about said sealing plug which engages said iris blades to provide a seal between said sealing plug and said iris blades to prevent the air from passing through said open cross-section when said iris blades close off said open cross-section, said seal is a separate material attached about said sealing plug and includes a groove which engages said iris blades.

6. The damper system of claim 5, wherein said groove is v-shaped.

7. The damper system of claim 5, wherein said separate material is flexible in nature.

8. A damper system for controlling air flow in air ducting comprising:
    an iris damper having a casing, iris blades, and an open cross-section to allow air to pass;

a sealing plug mounted in said open cross-section, said sealing plug includes at least one air flow input to receive said air flow from the ducting, said sealing plug includes a chamber to receive said air flow from said open inlet, and said chamber includes a pressure port to provide pressure measurements to a signal processor;

a seal about said sealing plug which engages said iris blades to provide a seal between said sealing plug and said iris blades to prevent the air from passing through said open cross-section when said iris blades close off said open cross-section.

9. The damper system of claim 8, wherein said seal is a groove about said sealing plug.

10. The damper system of claim 9, wherein said groove includes gasket material in said groove.

11. The damper system of claim 8, wherein said seal is a separate material attached about said sealing plug.

12. The damper system of claim 11, wherein said separate material includes a groove which engages said iris blades.

13. The damper system of claim 12, wherein said groove is v-shaped.

14. The damper system of claim 11, wherein said separate material is flexible in nature.

15. The damper system of claim 8, wherein said damper system includes a static pressure port to provide static pressure measurements said signal processor.

16. The damper system of claim 15, wherein said seal is a groove in said sealing plug.

17. The damper system of claim 16, wherein said groove includes gasket material in said groove.

18. The damper system of claim 15, wherein said seal is a separate material attached about said sealing plug.

19. The damper system of claim 18, wherein said separate material includes a groove which engages said iris blades.

20. The damper system of claim 19, wherein said groove is v-shaped.

21. The damper system of claim 18, wherein said separate material is flexible in nature.

22. The damper system of claim 15, wherein said sealing plug includes a plurality of air flow inputs to receive said air flow from the ducting.

23. The damper system of claim 8, wherein said sealing plug includes a plurality of air flow inputs to receive said air flow from the ducting.

24. The damper system of claim 8, wherein said chamber includes a porous noise absorption media to suppress noise created by the air flow entering said chamber.

* * * * *